E. Rhodes, Jr.
Horse Hay-Fork.
N° 83794.
Patented Nov. 3, 1868.

Witnesses.

Inventor.

ELIAS RHODES, JUNR., OF CLYDE, OHIO.

Letters Patent No. 83,794, dated November 3, 1868.

---

IMPROVEMENT IN HORSE HAY-FORKS.

---

The Schedule referred to in these Letters Patent and making part of the same.

---

*To all whom it may concern:*

Be it known that I, ELIAS RHODES, Junr., of Clyde, in the county of Sandusky, and State of Ohio, have invented certain new and useful Improvements in Horse Hay-Forks; and I do hereby declare that the following is a full, clear, and exact description thereof, reference being had to the accompanying drawings, and to the letters of reference marked thereon, which form a part of this specification, and in which—

Figure 1:
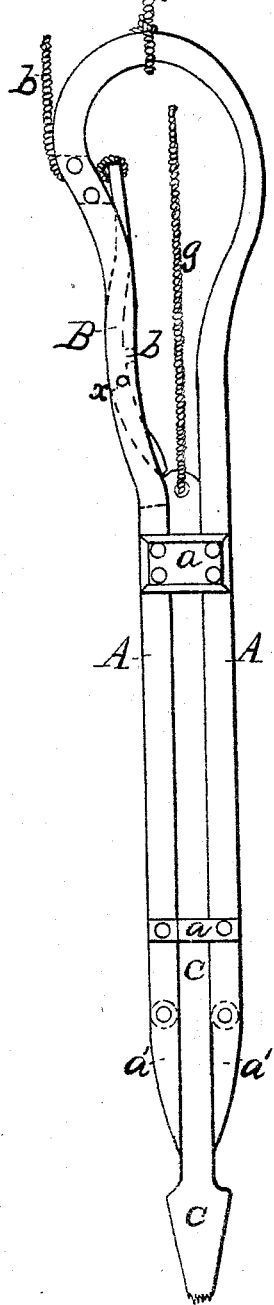
Figure 2:
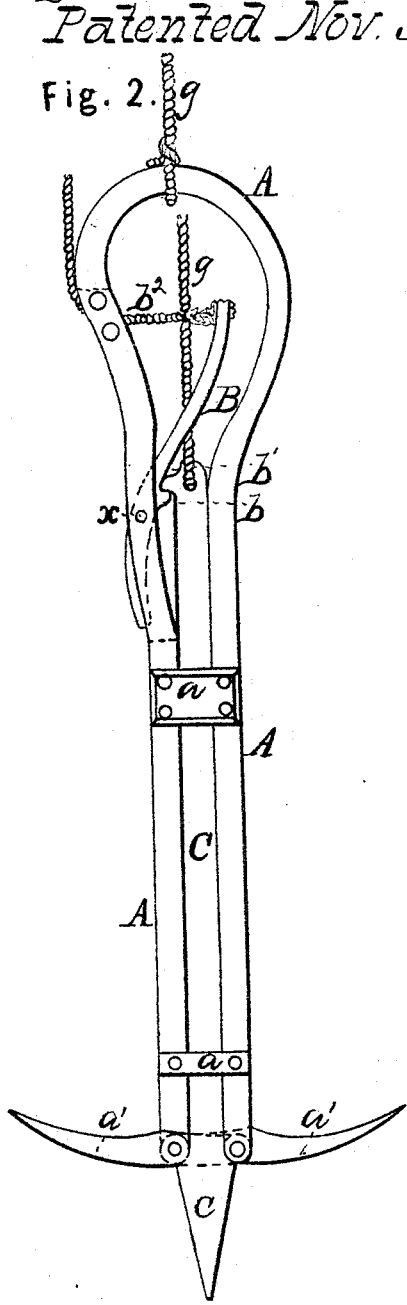

Figure 1 represents a side elevation of my hay-fork, when in position to be thrust into the hay, and Figure 2, a similar view, showing the fork in position when loaded.

The nature of my invention consists in the employment, in a horse hay-fork, of a lever, formed with a shoulder, and so constructed that it will cause the said shoulder, when the fork is ready to be loaded, to engage with another shoulder on the central shaft of the fork, and thus enable it to be locked, and, by means of this lever, the fork, when ready to be thrust into the hay, can also be locked, substantially as will be hereinafter set forth.

To enable others skilled in the art to make and employ my invention, I will now describe it.

In the accompanying drawings, A represents the shank or body of the fork, which consists of two bars, curved, and connected together at their upper ends, and extending down therefrom, and running parallel with each other, a suitable distance apart.

These bars are braced together, near their centre and lower ends, by pieces $a\ a$.

One of these bars is provided with a slot on its upper end, to receive the lever B, which is pivoted therein, near its lower end, at the point $x$.

The lever B, a short distance above the point where it is pivoted, is formed with a shoulder, $b$, which, when the central shaft $c$ is slid up, causing the prongs $a'\ a'$ of the bars of body or shank A to be extended, ready to receive the hay, will engage with a shoulder or projection, $b^1$, on the upper end of shaft $c$, thus locking said shaft, and thereby firmly retain the prongs $a'\ a'$ at right angles with the shank A, for the purpose above stated.

The lever B, when disengaged from the shaft $c$, said shaft will fall, and cause the prongs $a'\ a'$ to be drawn into the slotted portion of shaft $c$, with their lower ends or points flush with the inclined surface of said shaft, ready to be thrust into the hay, and be held in this position by pulling the lever B outwards by cord $b^2$, causing its lower end to fit or rest on the shoulder $b^1$ of shaft $c$.

$g$ is a cord, attached to shaft $c$, for elevating the same, by which the prongs are extended.

$g'$ is a cord, for holding the fork while being thrust into and drawn from the hay-stack.

Having thus described my invention,

What I claim, and desire to secure by Letters Patent, is—

The lever B, formed with the shoulder $b$, in combination with the central sliding shaft $c$, formed with the shoulder $b^1$, shank or body A, consisting of two bars, connected together at their upper ends, and supplied with prongs $a'\ a'$, passing through shaft $c$, and cords $b^2$, $g$, and $g'$, all constructed and operated substantially as and for the purpose set forth.

In testimony that I claim the foregoing as my own, I affix my signature, in presence of two witnesses.

ELIAS RHODES, JUNR.

Witnesses:
N. B. MASON,
JAS. ZEPERINCK.